United States Patent
Buglione

[19]

[11] Patent Number: 6,073,712
[45] Date of Patent: Jun. 13, 2000

[54] METHOD OF POWER OUTPUT LEVEL CONTROL FOR A HYBRID POWER TRAIN SYSTEM

[75] Inventor: Arthur J. Buglione, White Lake Township, Mich.

[73] Assignee: Chrysler Corporation, Auburn Hills, Mich.

[21] Appl. No.: 08/788,730

[22] Filed: Jan. 23, 1997

[51] Int. Cl.[7] .................................................. B60K 1/04
[52] U.S. Cl. ................................ 180/65.2; 180/165
[58] Field of Search ................................ 180/65.2, 65.3, 180/65.4, 165; 20/45; 701/99; 60/709, 719

[56] References Cited

U.S. PATENT DOCUMENTS

| | | | |
|---|---|---|---|
| 3,870,116 | 3/1975 | Seliber ..................................... | 180/165 |
| 3,874,472 | 4/1975 | Deane ..................................... | 180/65.4 |
| 3,882,950 | 5/1975 | Strohlein ................................. | 180/165 |
| 3,886,810 | 6/1975 | Sugiyama et al. ........................ | 74/751 |
| 4,131,171 | 12/1978 | Keyes . | |
| 4,148,192 | 4/1979 | Cummings ................................ | 60/716 |
| 4,165,795 | 8/1979 | Lynch et al. . | |
| 4,309,620 | 1/1982 | Bock ....................................... | 290/4 R |
| 4,335,429 | 6/1982 | Kawakatsu .............................. | 180/65.2 |
| 4,444,285 | 4/1984 | Stewart et al. ........................... | 180/65.4 |
| 4,458,156 | 7/1984 | Maucher et al. ......................... | 180/165 |
| 4,495,451 | 1/1985 | Barnard .................................. | 180/65.4 |
| 4,533,011 | 8/1985 | Heidemeyer et al. ................... | 180/65.2 |
| 4,583,505 | 4/1986 | Frank et al. ........................... | 123/198 F |
| 4,588,040 | 5/1986 | Albright, Jr. et al. .................. | 180/165 |
| 4,597,463 | 7/1986 | Barnard .................................. | 180/165 |
| 4,631,456 | 12/1986 | Drescher et al. ....................... | 318/140 |
| 4,680,986 | 7/1987 | Elsner .................................... | 74/866 |
| 4,888,949 | 12/1989 | Rogers ................................... | 60/434 |
| 4,900,962 | 2/1990 | Hockney et al. ....................... | 310/90.5 |
| 4,961,352 | 10/1990 | Downer et al. ......................... | 74/5.46 |
| 5,172,784 | 12/1992 | Varela, Jr. .............................. | 180/65.4 |
| 5,255,733 | 10/1993 | King ....................................... | 165/39 |
| 5,285,862 | 2/1994 | Furutani et al. ....................... | 180/65.4 |
| 5,291,975 | 3/1994 | Johnson et al. ........................ | 188/378 |
| 5,318,142 | 6/1994 | Bates et al. ............................ | 180/65.2 |
| 5,319,273 | 6/1994 | Hockney et al. ....................... | 310/90.5 |
| 5,327,987 | 7/1994 | Abdelmalek ............................ | 180/65.2 |
| 5,343,970 | 9/1994 | Severinsky .............................. | 180/65.2 |
| 5,345,761 | 9/1994 | King et al. .............................. | 60/274 |
| 5,353,656 | 10/1994 | Hawkey et al. ........................ | 74/5.41 |
| 5,396,140 | 3/1995 | Goldie et al. ........................... | 310/268 |
| 5,427,194 | 6/1995 | Miller .................................... | 180/165 |
| 5,442,288 | 8/1995 | Fenn et al. ............................. | 324/244 |
| 5,465,015 | 11/1995 | Anastas et al. ......................... | 310/26 |
| 5,614,809 | 3/1997 | Kiuchi et al. .......................... | 180/65.2 |
| 5,664,635 | 9/1997 | Koga et al. ............................. | 180/65.3 |

OTHER PUBLICATIONS

Popular Science, Emerging Technologies For The Supercar, Jun. 1994, pp. 1–2.

NASA Tech Briefs The Digest of New Technology, "Launching The Patriot", Jun. 1995, vol. 19, No. 6, pp. 1, 12, and 13.

*Primary Examiner*—Brian L. Johnson
*Assistant Examiner*—Frank Vanaman
*Attorney, Agent, or Firm*—Mark P. Calcaterra

[57] ABSTRACT

A method of power output level control for a hybrid powertrain system includes the step of checking if there is a predetermined level of energy stored in a energy storage apparatus. The method further includes the step of checking if there is a predetermined level of power available if there is a predetermined level of energy. The method also includes the step of reserving a predetermined power level amount from the energy storage apparatus if there is power available. The method includes the step of determining if a predetermined enabling condition is met and releasing the reserved power level amount if the predetermined enabling condition is met.

4 Claims, 3 Drawing Sheets

METHOD OF POWER OUTPUT LEVEL CONTROL FOR A HYBRID POWER TRAIN SYSTEM

BACKGROUND OF THE INVENTION

1. Field of the Invention

The present invention relates generally to powertrain systems in vehicles, and, more particularly, to a hybrid powertrain system in a motor vehicle.

2. Description of the Related Art

Since the invention of power vehicles, many different powertrain systems have been attempted, including a steam engine with a boiler or an electric motor with a storage battery. It was, however, the discovery of petroleum in 1856 and the four-stroke internal combustion engine invented by Otto in 1876, that provided the impetus for the modern automotive industry.

Although fossil fuel emerged as the fuel of choice for automotive vehicles, recent concerns regarding fuel availability and increasingly stringent federal and state emission regulations have renewed interest in alternative fuel powered vehicles. For example, alternative fuel vehicles may be powered by methanol, ethanol, natural gas, electricity or a combination of fuels.

A dedicated electric powered vehicle offers several advantages: electricity is readily available; an electric power distribution system is already in place; and an electric powered vehicle produces virtually zero emissions. There are several technological disadvantages that must be overcome before electric powered vehicles gain acceptance in the marketplace. For instance, the range of an electric powered vehicle is limited to approximately 100 miles, compared to about 300 miles for a similar gasoline powered vehicle. Further, the acceleration is significantly less than that of a comparable gasoline powered vehicle.

A hybrid powered vehicle, powered by a renewable and a non-renewable energy source, overcomes the technical disadvantages of a dedicated electric vehicle while having almost the same environmental benefit as a dedicated electric vehicle. The performance and range characteristics are comparable to a conventional gasoline powered vehicle. Therefore, there is a need in the art for a hybrid powertrain system in a motor vehicle that is energy efficient, has low emissions, and offers the performance of a conventional gasoline powered vehicle.

SUMMARY OF THE INVENTION

It is, therefore, one object of the present invention to provide a method of power output level control for a hybrid powertrain system.

It is another object of the present invention to provide a method of power output level control that reserves a predetermined power level amount within an energy storage apparatus for a hybrid powertrain system.

It is still another object of the present invention to provide a method of power output level control that reserves a predetermined power level amount within an energy storage apparatus prior to starting a secondary power source for a hybrid powertrain system.

It is yet another object of the present invention to provide a method of power output level control that releases the reserved predetermined power level for a hybrid powertrain system.

To achieve the foregoing objects, the present invention is a method of power output level control for a hybrid powertrain system. The method includes the step of checking if there is a predetermined level of energy stored in an energy storage apparatus. The method further includes the step of checking if there is a predetermined level of power available if there is a predetermined level of energy. The method also includes the step of reserving a predetermined power level from the energy storage apparatus if there is power available. The method includes the step of determining if a predetermined enabling condition is met and releasing the reserved power level amount if the predetermined enabling condition is met.

One advantage of the present invention is that a method of power output level control for a hybrid powertrain system is provided. Another advantage of the present invention is that the method reserves a predetermined power level amount within an energy storage apparatus. Yet another advantage of the present invention is that the method reserves a predetermined power level amount ensuring that there will be sufficient power available to start a secondary power source. Still another advantage of the present invention is that the reserved power level amount is made available for use after an enabling condition is satisfied, such as the transition to a full hybrid operation.

Other objects, features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
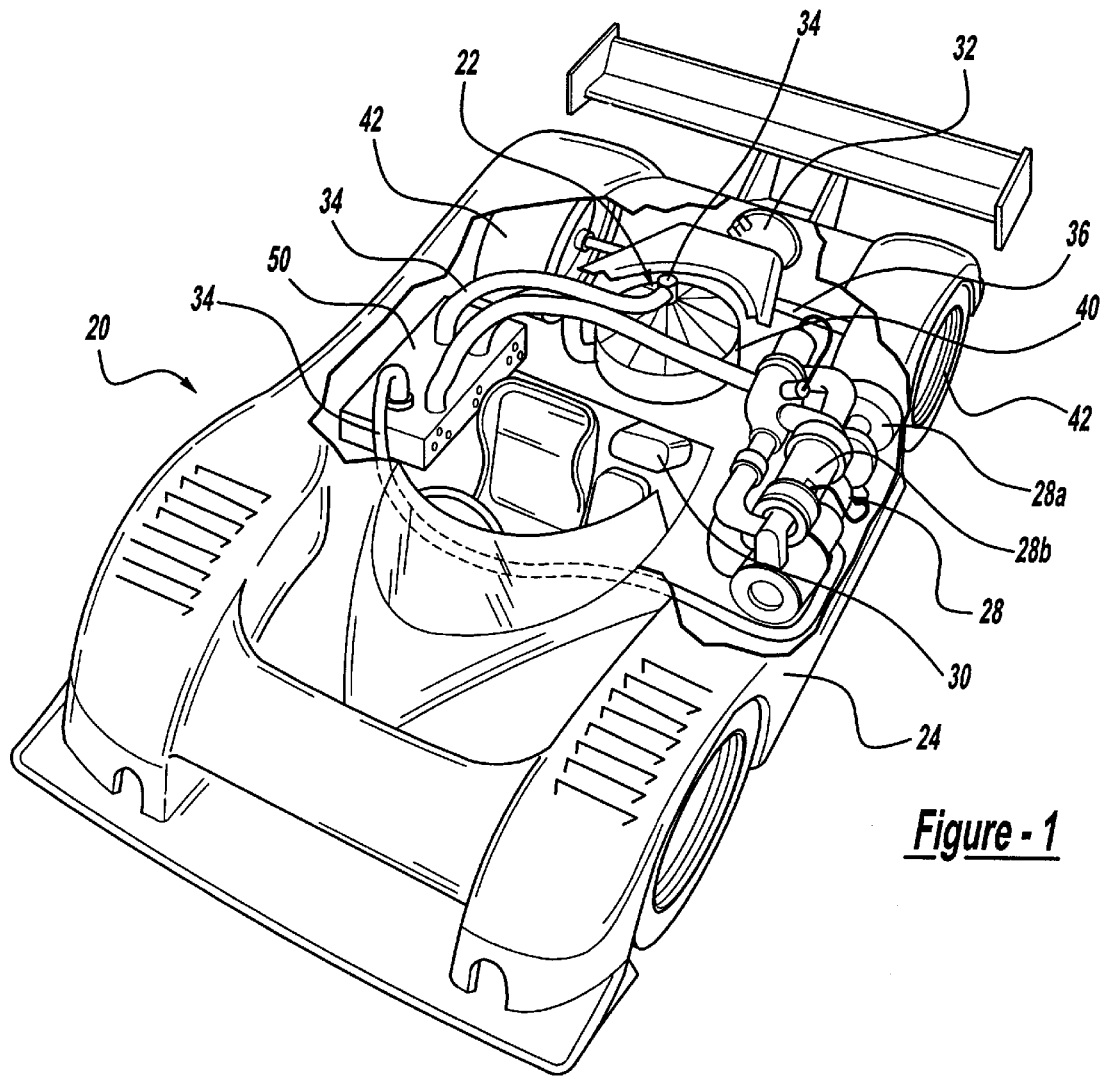
FIG. 1 is a schematic diagram of a hybrid powertrain system for a motor vehicle according to the present invention.
Figure 2:
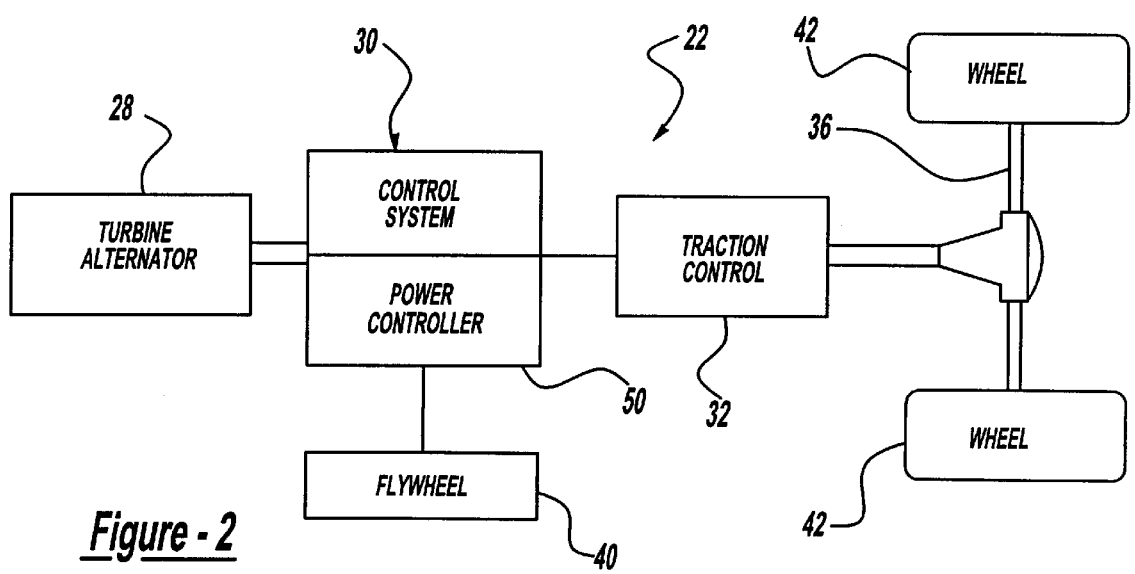
FIG. 2 is a block diagram of an operational relationship of a hybrid powertrain system for a motor vehicle according to the present invention.

Referring to FIGS. 1 and 2, one embodiment of a hybrid powertrain system is illustrated for a vehicle 20. The vehicle 20 is partially shown in a cut away view illustrating a hybrid powertrain system 22 disposed within a chassis 24 of the vehicle 20. The hybrid powertrain system 22 includes a hydrocarbon based fuel powered generator 28, which in this example is fueled by liquefied natural gas. In the preferred embodiment, the gas powered generator 28 is a turbine engine 28a operatively connected to an alternator 28b. The turbine engine 28a spins the alternator 28b to generate electric power. It should also be appreciated that the turbine engine 28a and the alternator 28b may be referred to as a turboalternator.

The hybrid powertrain system 22 includes a vehicle management controller 30 which manages the distribution of power within the hybrid powertrain system 22. The vehicle management controller 30 directs the transfer of power from an energy source such as the turboalternator 28 to an energy user such as a traction or induction motor 32 using a power transfer bus 34a, which carries a three phase variable frequency alternating current (VFAC). In this example, the traction motor 32 is an AC induction traction motor. The traction motor 32 transfers its energy to the drivetrain 36 and eventually to the wheels 42 to propel the vehicle 20.

The hybrid powertrain system 22 also includes an energy storage apparatus such as a flywheel 40. It should be appreciated that the flywheel 40 is mechanical analog to a battery (not shown but well known in the art) as a vehicle energy storage apparatus. The vehicle management controller 30 directs power from the alternator 28b through VFAC bus 34b to the flywheel 40 via power controller 50 for storage during periods of low power demand. Alternatively, the vehicle management controller 30 directs the stored power from the flywheel 40 to the traction motor 32 during period of increased power demand.

Accordingly, a signal from an accelerator mechanism (not shown) to accelerate the vehicle 20 is communicated to the vehicle management controller 30. The vehicle management controller 30 directs the supply of power to the traction motor 32 so that it can generate a specified torque and, eventually, drive to the wheels 42. If the power delivered to the traction motor 32 is less than that being supplied by the turboalternator 28, the vehicle management controller 30 directs the excess power capacity into the flywheel 40 for storage. If the power required by the traction motor 32 is greater than that being supplied by the turboalternator 28, the vehicle management controller 30 balances the power deficit with energy from the flywheel 40.

In the preferred embodiment, the hybrid powertrain system 22 includes a controller mechanism for further controlling electrical power flow to or from a component. For example, a power controller 50 directs converting, storing and transferring power between the turboalternator 28, traction motor 32 and flywheel 40, based on an instruction from the vehicle management controller 30. The power controller 50 transfers power for start up of the turbine engine 28a, by supplying electrical power to the alternator 28b causing the alternator 28b to act like a motor and spin up the turbine engine 28a until it is running.

The vehicle management controller 30 manipulates and controls the power controller 50 to selectively transfer the power based on various operating conditions of the vehicle 20, and to synthesize a sinusoidal current waveform to operate the turboalternator 28, traction motor 32 and the flywheel 40 at the desired levels.

Preferably, the hybrid powertrain system 22 also includes various critically placed sensors (not shown) which are conventional and well known in the art. The outputs of these sensors communicate with the vehicle management controller 30. It should also be appreciated that the vehicle 20 includes other hardware not shown, but conventional in the art, that cooperate with the hybrid powertrain system 22.

Figure 3:
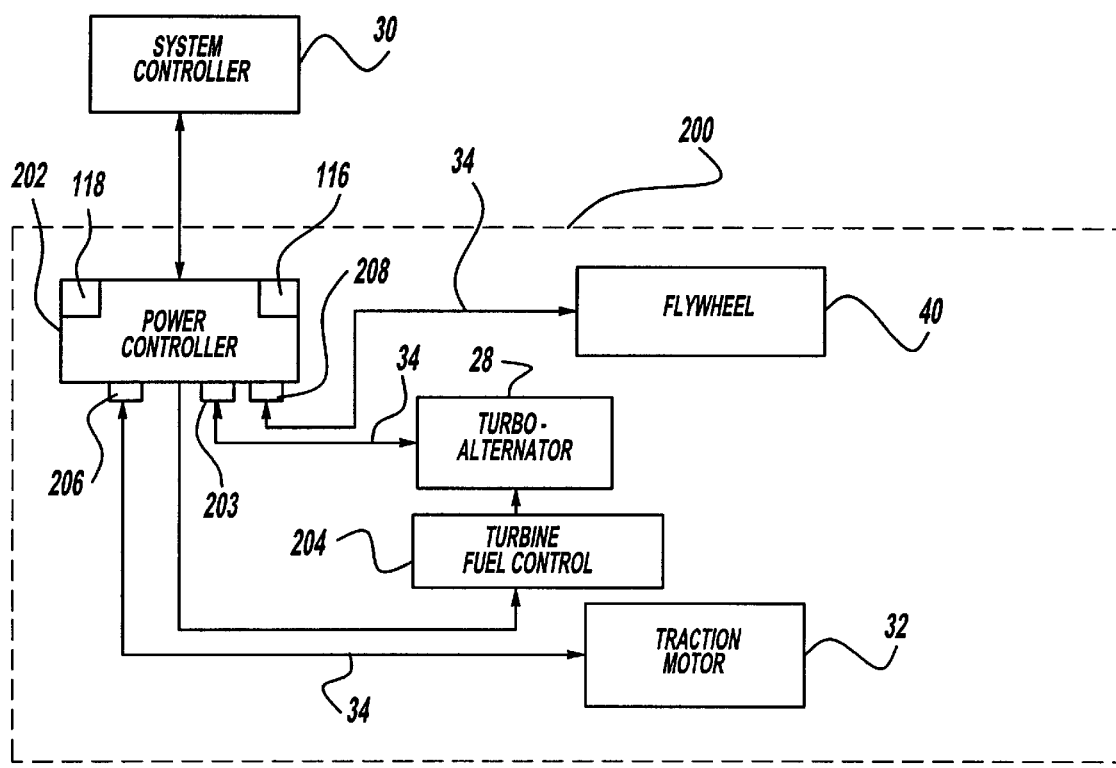
FIG. 3 is a block diagram of a power output level control architecture for a hybrid powertrain system for a motor vehicle according to the present invention.

Referring to FIG. 3, a power output level control architecture 200 is shown for the hybrid powertrain system 22. The power output level control architecture 200 receives input commands from the vehicle management controller 30 and sends system status output information to the vehicle management controller 30. The signals are sent into and sent from the power controller 202. The power controller 202 controls all of the electrical power flow to or from components therein, discussed subsequently. The power controller 202 also performs an orderly shut down of the power output level control architecture 200 in the event a disturbance is sensed. The power controller 202 further includes a direct current (DC) storage assembly 116, such as a capacitor bank, as is well understood in the art. The DC power is communicated to the power output level control architecture 200 through a DC bus 118, as discussed herein.

The turboalternator 28 provides an output that is substantially constant, as commanded by the vehicle management controller 30, once the turboalternator 28 is past a start up period. The turboalternator 28 output is connected through the VFAC bus 34b to the power controller 202, where AC to DC power conversion occurs. During a start, the power on the DC bus 118 is converted to AC in the power controller 202 and transferred through the VFAC bus 34b to the turboalternator unit 28. The alternator 28a momentarily acts as a motor and spins the turbine 28b to start the turbine 28b. The power controller 202 is also in communication with a turbine fuel controller 204. The turbine fuel controller 204 further controls the delivery of power to and from the turboalternator 28, and is well known to those skilled in the art.

The traction motor 32 is connected to the power controller 202 through the VFAC line bus 34b. The DC to AC conversion, or AC to DC conversion takes place in the power controller 202. For example, the traction motor 32 is a torque regulator and provides power to or draws power from the, DC bus 118 at a rate consistent with a specific instantaneous torque requirement. The torque requirement is not a function of the voltage potential across the DC bus 118 and, therefore, does not depend thereon. The torque is a result of controlling the DC to AC conversion.

The flywheel 40 bilaterally transfers power along the VFAC bus 34a to the power controller 202, where the AC to DC conversion occurs to connect, to the DC bus 118. More specifically, the flywheel 40 performs as the voltage regulator for the DC bus 118 in the power controller 202. The flywheel 40 does so by the bilateral transfer of power therebetween. Of the turboalternator 28, the traction motor 32, and the flywheel 40, only the flywheel 40 transfers power to and from the power controller 202, based on the voltage potential across the DC bus 118.

The control of the voltage potential across the DC bus 118 is accomplished as follows. If the voltage is greater than a predetermined level, power is sent to the flywheel 40 increasing the rotational speed of the flywheel, thus storing energy. Conversely, if the DC bus 118 voltage is lower than a predeterminal level, power is drawn from the flywheel 40, thus slowing its rotational speed.

There is a predetermined range of power that can be stored or withdrawn from the flywheel 40, as well as a predetermined range of energy that can be stored.

Figure 4:
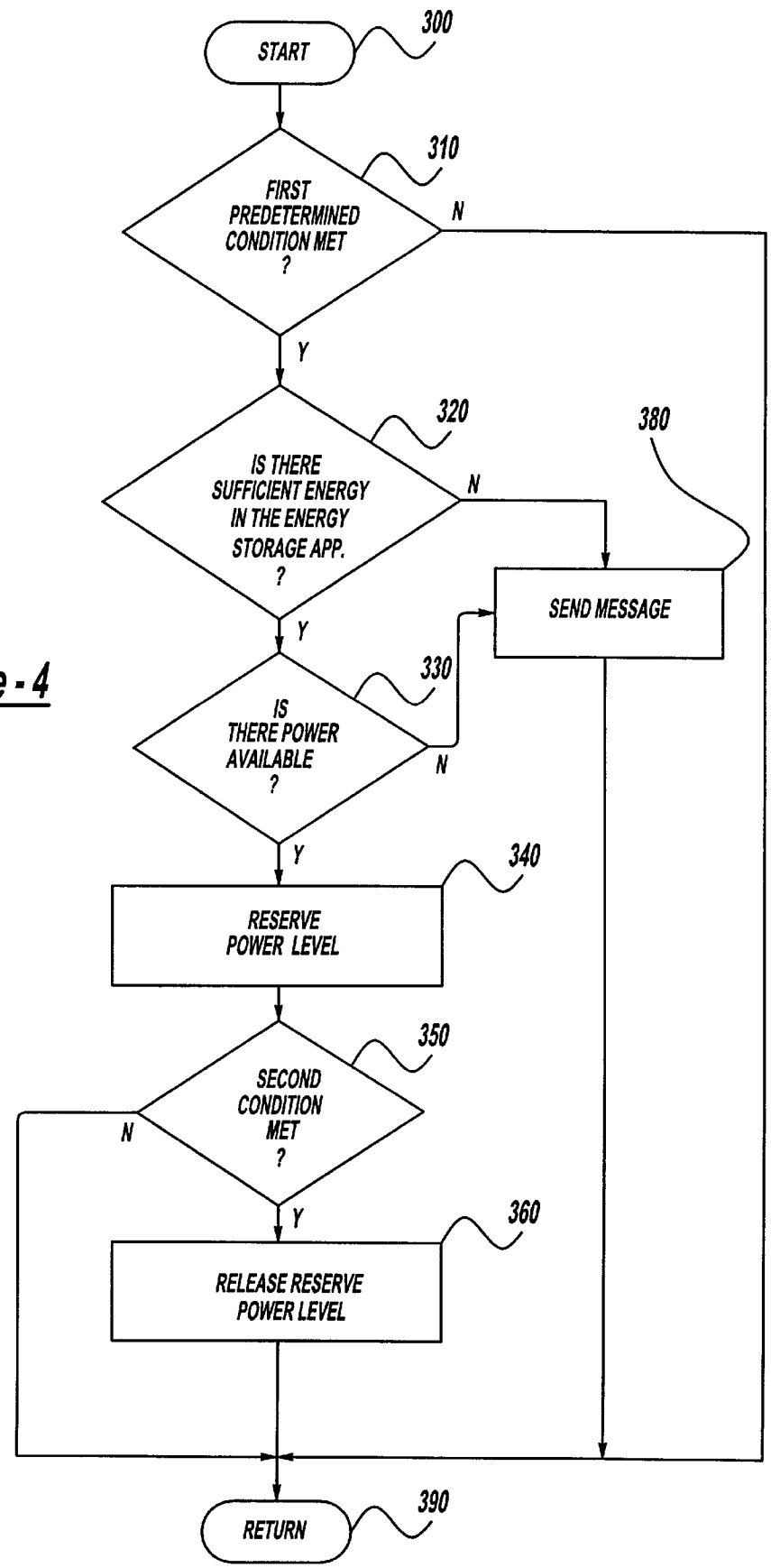
FIG. 4 is a flowchart of a method, according to the present invention, of power output level control for the hybrid powertrain system of FIG. 3.

Referring to FIG. 4, a flowchart of a method, according to the present invention, of power output level control for a hybrid powertrain system 22 is illustrated. The flexibility of a hybrid powertrain system allows a hybrid motor vehicle to rely on a primary power source, such as electric power when power demands are low, and draw from the primary and a secondary power source as power demands increase. It should be appreciated that the secondary power source of this example is a turboalternator 28 operating on liquefied natural gas. Another example of a type of secondary power source is an internal combustion reciprocating piston engine.

It should be appreciated that the hybrid powertrain system 22 of this example is a series configuration hybrid powertrain as is well known in the art.

The functionability of a particular component of the hybrid powertrain system 22 may require a predetermined quantity of power. For example, the starting of the turboalternator 28 necessitates a predetermined amount of power. The methodology to be described reserves a predetermined power level amount for a particular component of the hybrid powertrain system 22 to ensure that power is available when required by that particular component.

In the preferred embodiment, the methodology reserves power for the starting of the turboalternator 28. Preferably, the vehicle is in a first predetermined mode, such as a motor mode, prior to the methodology being called for. An example of the motor mode includes a period after the vehicle is switched "ON". Another example of the motor mode includes a period of low power demand. During the motor mode, power is supplied to the traction motor 32 by the flywheel 40. If more performance is desired, such as increased power or extended operating range, a second predetermined mode, such as the full power mode, is activated and the secondary source, or turboalternator 28 of this example, is called upon to supply additional power. Preferably, a transition to the full power mode is initiated through a vehicle operator activating a control mechanism such as a switch (not shown).

The methodology is called for in transitioning to the full power mode. The methodology begins in block 300 and advances to to decision block 310. N decision block 310 the methodology determines if a first predetermined enabling condition is satisfied for continuing the methodology. An example of a first predetermined enabling condition is if operation of the turboalternator 28 is desired. Another example of a first predetermined enabling condition is if the turboalternator 28 is already running. If a first enabling condition. is not satisfied, the methodology advances to block 390, to be described. If a first enabling condition is satisfied, the methodology continues to decision block 320.

In decision block 320 the methodology determines if there is sufficient energy stored in an energy storage apparatus, such as the flywheel 40. If there is not sufficient energy in the flywheel 40, the methodology advances to 380. In block 380, a message is communicated, such as to the vehicle operator, that there is insufficient energy available. The methodology then advances to block 390, to be described.

If there is sufficient energy in the flywheel 40, the methodology advances to decision block 330. In decision block 330 the methodology determines if there is sufficient power available, such as to start the turboalternator 28. The power can be drawn from the flywheel 40 or an external source. If there is not sufficient power available, the methodology advances to block 380, previously described.

Returning to block 330, if there is sufficient power available, the methodology advances to block 340. In block 340, the methodology reserves or holds back a predetermined power level amount, such as the turbine starting power level, from the available power in the flywheel 40. This reserved power level amount is unavailable for use by other vehicle components. By holding back power in reserve, vehicle components such as the power controller 50, or the DC bus 118 are not overdrawn by other components of the hybrid powertrain system 22. It should be appreciated that the performance of other hybrid powertrain system 22 components may have to be adjusted to compensate for the reduced available power.

The methodology advances to decision block 350 and determines whether a second predetermined enabling condition is satisfied before releasing the reserved power level amount. An example of a second predetermined enabling condition is if the turboalternator 28 is running. Another example of a second predetermined enabling condition is if a power level amount is reserved. If the second predetermined enabling condition is not satisfied, the methodology advances to block 390. If the second predetermined enabling condition is satisfied, the methodology advances to block 360. In block 360 the methodology releases the reserved power amount, thereby freeing this power for use by other hybrid powertrain system 22 components as required.

The methodology advances to block 390 and the methodology ends.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of power output level control for a hybrid powertrain system having a first energy source comprising a fuel-powered generator and a second energy source comprising an energy storage apparatus, said method comprising the steps of:

monitoring for an indication of a desire to start the fuel-powered generator;

checking if there is a predetermined level of energy stored in the energy storage apparatus;

ending the method if there is not a predetermined level of energy stored in the energy storage apparatus;

checking if there is a predetermined level of generator starting power available if there is a predetermined level of energy;

reserving a predetermined generator starting power level amount from the energy storage apparatus if there is power available;

determining if a predetermined generator starting condition is met; and releasing the reserved power level amount to start the generator if the predetermined generator starting condition is met.

2. A method as set forth in claim 1 including the step of ending the method if there is not a predetermined level of generator starting power available after said step of checking if there is a predetermined level of generator starting power available.

3. A method of power output control for a hybrid powertrain system having a fuel-powered generator power source and an energy storage flywheel, the method comprising;

checking if there is an indication of a desire to start the fuel-powered generator;

checking if there is a predetermined level of energy stored in the flywheel;

ending the method if there is not a predetermined level of energy stored in the flywheel;

checking if there is a predetermined level of power available to start the fuel-powered generator if there is a predetermined level of energy;

waiting until power becomes available if there is not a predetermined level of power available to start the fuel-powered generator;

reserving a predetermined power level amount from the flywheel if there is a predetermined level of power available;

determining if a predetermined enabling condition is met; and releasing the reserved power level amount if the predetermined enabling condition is met.

4. A method as set forth in claim 3 wherein the predetermined enabling condition comprises determining if the fuel-powered generator is started.

* * * * *